United States Patent
Christiansen et al.

(10) Patent No.: US 6,207,204 B1
(45) Date of Patent: Mar. 27, 2001

(54) CEREAL GRAIN KERNELS FORTIFIED WITH AMINO ACID CHELATES AND METHOD OF MAKING

(75) Inventors: Earl C. Christiansen, South Ogden; Stephen D. Ashmead, Clinton, both of UT (US)

(73) Assignee: Albion International, Inc., Clearfield, UT (US)

( * ) Notice: Subject to any disclaimer, the term of this patent is extended or adjusted under 35 U.S.C. 154(b) by 0 days.

(21) Appl. No.: 09/335,934

(22) Filed: Jun. 18, 1999

(51) Int. Cl.⁷ .............................. A23L 1/304; A23B 9/30
(52) U.S. Cl. .............................. 426/74; 426/93; 426/573; 426/629; 426/656
(58) Field of Search .............................. 426/74, 93, 629, 426/656, 573

(56) References Cited

U.S. PATENT DOCUMENTS

| | | |
|---|---|---|
| 4,020,158 | 4/1977 | Ashmead et al. . |
| 4,167,564 | 9/1979 | Jensen . |
| 4,216,143 | 8/1980 | Ashmead . |
| 4,216,144 | 8/1980 | Ashmead . |
| 4,599,152 | 7/1986 | Ashmed . |
| 4,687,669 | 8/1987 | Moritaka et al. . |
| 4,725,427 | 2/1988 | Ashmead et al. . |
| 4,774,089 | 9/1988 | Ashmead . |
| 4,830,716 | 5/1989 | Ashmead . |
| 4,863,898 | 9/1989 | Ashmead et al. . |
| 4,931,292 | 6/1990 | Torstensson et al. . |
| 5,702,745 | 12/1997 | Yang et al. . |

FOREIGN PATENT DOCUMENTS

97/15201   10/1995   (WO) .

Primary Examiner—Helen Pratt
(74) Attorney, Agent, or Firm—Thorpe North & Western, LLC

(57) ABSTRACT

A cereal grain kernel coated with a metal amino acid chelate, a method for mineral or metal fortification of cereal grain kernels and a coating composition is disclosed. Unlike other metal or mineral fortificants, cereal grain kernels may be coated with iron, calcium, zinc and/or other metals in the form of an amino acid chelate without pulverizing individual kernels. Further, the coated kernels are stable, palatable and contain highly bioavailable metals.

58 Claims, No Drawings

CEREAL GRAIN KERNELS FORTIFIED WITH AMINO ACID CHELATES AND METHOD OF MAKING

FIELD OF THE INVENTION

The present invention is directed toward a composition and method for fortification of cereal grain kernels. More specifically, this invention relates to compositions and methods of making fortified cereal grain kernels wherein individual kernels are coated with compounds containing metal amino acid chelates that are stable, palatable and contain highly bioavailable metals.

BACKGROUND OF THE INVENTION

Cereal is defined as any plant from the grass family that yields an edible grain (seed). Some of the more popular grains include barley, corn, millet, oats, quinoa, rice, rye, sorghum, triticale, wheat and wild rice. Further, cereal grains are considered a staple throughout the world because they are generally inexpensive, a readily available source of protein and have high carbohydrate content.

Comparing the various cereal grains, a high percentage of the world's food is rice based. The annual world rice production during a typical year is between 500 and 600 million metric tons. This amount of rice comes from over 50 countries throughout the world who contribute at least 100,000 tons of rice annually. The United States rice production has recently been over 8 million metric tons accounting for 1 and 2% of total world production. Although the consumption of rice in the U.S. is small by comparison to many Asian countries, consumption has increased 30% over the past 10 years. This is in part due to the general interest in rice for improving health.

On the other hand, wheat also makes up a high percentage of the world's food. In fact, wheat's status as a staple is second only to rice. One reason for the popularity of wheat is that, unlike other cereals, wheat contains a relatively high amount of gluten, the protein that provides the elasticity necessary for bread making. As such, wheat is typically ground into flour and used for various foods such as bread. Therefore, because wheat is generally ground up, it is easily fortified with iron and other minerals. Conversely, rice and other grains that are not typically ground into flour are more difficult to fortify.

One possible fortification method of cereals, such as rice, is to fortify the plant or grass from which the various cereal grains grow. The theory is that by adding minerals to the soil, the plant or grass will uptake those minerals and pass them on to the respective grains. A second possible fortification method of cereal grains is to coat actual kernels with desired vitamins and/or minerals.

Cereal grains have been fortified with many different vitamins and minerals. For example, vitamin A, vitamin C, vitamin E and B-complex vitamins have all been fortificants for cereal grains. Minerals used as fortificants have included iron, calcium, zinc, manganese, copper and other essential minerals. In considering various forms of iron and iron compounds, elemental iron, ferrous sulphate and ferrous fumarate have been used in the past as preferred iron fortificants. When selecting what iron fortificant to use, the color and taste of the iron compounds is a major consideration, especially when fortifying lightly colored foods. Therefore, a highly bioavailable form of iron may not be desirable to utilize because of resulting color changes and the unpalatability associated with a metallic taste. For example, though more soluble iron compounds such as ferrous sulfates are highly bioavailable, they often result in off-color and off-tasting grains.

The coating of rice and other grains for various purposes is not a new concept. In U.S. Pat. No. 5,702,745, a method of making a shelf-stable, ready-to-eat rice product is disclosed that involves coating pregelatinized rice grains with an emulsifier. The purpose of this coating is to provide a superior texture, appearance and flavor. In other words, the coating is not for delivery of vitamins and/or minerals. Further, in U.S. Pat. No. 4,687,669, a process for production of enriched rice or barley is disclosed. There, an oily or waxy coating is deposited on rice or barley. The coating is designed to remain intact while washing and to melt upon heating.

Additionally, fortifying grain products with iron is also not a new concept. In fact, in U.S. Pat. No. 4,931,292, the use of a certain type of complex iron(III)phosphate for iron fortification of grains is disclosed having good properties with respect to solubility near pH 1 (the pH found in the stomach), is bioavailable and almost colorless. The patent specifically mentions flours, breakfast cereals and rice as foods that may be fortified. An example or preferred embodiment of the invention is fortification by combining the food product with a complex of iron(III) phosphate having the formula $Fe_3H_8(NH_4)(PO_4)_6 \cdot 6H_2O$. This compound is shown to be more bioavailable than carbonyl iron in humans. Further, the patent alleges that the appearance and taste of the fortified grain remains largely unchanged compared unfortified foods.

Fortification using chelates is an alternative way to increase bioavailability. The term "chelate" has often been misunderstood or applied in a general or catch-all fashion. A true chelate has a definite structure resulting from precise requirements of synthesis. Proper conditions must be present for chelation to take place, including proper mole ratios of ligands to metal ions, pH and solubility of reactants. For chelation to occur, all components must be in solution and have an appropriate electronic configuration in order for covalent bonding to develop.

Chelation can be confirmed and differentiated from mixtures of components by infrared spectra through comparison of the stretching of bonds or shifting of absorption peaks caused by bond formation. As applied in the field of mineral nutrition, there are two allegedly "chelated" products which are commercially utilized. The first is referred to as a "metal proteinate." The American Association of Feed Control officials (AAFCO) has defined a "metal proteinate" as the product resulting from the chelation of a soluble salt with amino acids and/or partially hydrolyzed protein. Such products are referred to as the specific metal proteinate, e.g., copper proteinate, zinc proteinate, etc. This definition does not contain any requirements to assure that chelation is actually present. On the basis of the chemical reactant possibilities, there are some real reservations as to the probability of chelation occurring to any great degree. For example, the inclusion of partially hydrolyzed proteins as suitable ligands and the term "and/or" in reference to such ligands implies that products made solely from partially hydrolyzed protein and soluble salts would have the same biochemical and physiological properties as products made from combining amino acids and soluble metal salts. Such an assertion is chemically incorrect. Partially hydrolyzed protein ligands may have molecular weights in the range of thousands of daltons and any bonding between such ligands and a metal ion may be nothing more than a complex or some form of ionic attraction, i.e., the metal drawn in close proximity to a carboxyl moiety of such a ligand.

While some products marketed as metal proteinates during the 1960's and 1970's were true chelates, this was prior to the adoption of the AAFCO metal proteinate definition. An analysis of products currently marketed as metal proteinates reveals that most, if not all, are mixtures of metal salts and hydrolyzed protein or complexes between metal salts and hydrolyzed protein. Most are impure products which are difficult to analyze and are not consistent in protein make-up and/or mineral content.

An amino acid chelate, when properly formed, is a stable product having one or more five-membered rings formed by reaction between the carboxyl oxygen, and the α-amino group of an α-amino acid with the metal ion. Such a five-membered ring is defined by the metal atom, the carboxyl oxygen, the carbonyl carbon, the α-carbon and the α-amino nitrogen. The actual structure will depend upon the ligand to metal mole ratio. The ligand to metal mole ratio is at least 1:1 and is preferably 2:1 but, in certain instances, may be 3:1 or even 4:1. Most typically, an amino acid chelate may be represented at a ligand to metal ratio of 2:1 according to the following formula:

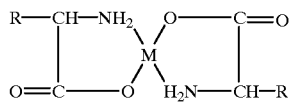

(Formula I)

In the above formula, when R is H, the amino acid is glycine which is the simplest of the α-amino acids. However, R could be representative of any other of the other twenty or so naturally occurring amino acids derived from proteins. These all have the same configuration for the positioning of the carboxyl oxygen and the α-amino nitrogen. In other words, the chelate ring is defined by the same atoms in each instance. The American Association of Feed Control Officials (AAFCO) has also issued a definition for an amino acid chelate. It is officially defined as the product resulting from the reaction of a metal ion from a soluble metal salt with amino acids with a mole ratio of one mole of metal to one to three (preferably two) moles of amino acids to form coordinate covalent bonds. The average weight of the hydrolyzed amino acids must be approximately 150 and the resulting molecular weight of the chelate must not exceed 800. The products are identified by the specific metal forming the chelate, e.g., iron amino acid chelate, copper amino acid chelate, etc.

The reason a metal atom can accept bonds over and above the oxidation state of the metal is due to the nature of chelation. In Formula I, it is noted that one bond is formed from the carboxyl oxygen. The other bond is formed by the α-amino nitrogen which contributes both of the electrons used in the bonding. These electrons fill available spaces in the d-orbitals. This type of bond is known as a dative bond or a coordinate covalent bond and is common in chelation. Thus, a metal ion with a normal valency of +2 can be bonded by four bonds when fully chelated. When chelated in the manner described the divalent metal ion, the chelate is completely satisfied by the bonding electrons and the charge on the metal atom (as well as on the overall molecule) is zero. This neutrality contributes to the bioavailability of metal amino acid chelates.

Amino acid chelates can also be formed using peptide ligands instead of single amino acids. These will usually be in the form of dipeptides, tripeptides and sometimes tetrapeptides because larger ligands have a molecular weight which is too great for direct assimilation of the chelate formed. Generally, peptide ligands will be derived by the hydrolysis of protein. However, peptides prepared by conventional synthetic techniques or genetic engineering can also be used. When a ligand is a di- or tripeptide a radical of the formula $[C(O)CHRNH]_e$ H will replace one of the hydrogens attached to the nitrogen atom in Formula I. R, as defined in Formula I, can be H, or the residue of any other naturally occurring amino acid and e can be an integer of 1, 2 or 3. When e is 1 the ligand will be a dipeptide, when e is 2 the ligand will be a tripeptide and so forth.

The structure, chemistry and bioavailability of amino acid chelates is well documented in the literature, e.g. Ashmead et al., Chelated Mineral Nutrition, (1982), Chas. C. Thomas Publishers, Springfield, Ill.; Ashmead et al., Intestinal Absorption of Metal Ions, (1985), Chas. C. Thomas Publishers, Springfield, Ill.; Ashmead et al., Foliar Feeding of Plants with Amino Acid Chelates, (1986), Noyes Publications, Park Ridge, N.J.; U.S. Pat. Nos. 4,020,158; 4,167,564; 4,216,143; 4,216,144; 4,599,152; 4,774,089; 4,830,716; 4,863,898 and others. Further, flavored effervescent mixtures of vitamins and amino acid chelates for administration to humans in the form of a beverage are disclosed in U.S. Pat. No. 4,725,427.

One advantage of amino acid chelates in the field of mineral nutrition is attributed to the fact that these chelates are readily absorbed in the gut and mucosal cells by means of active transport as though they were solely amino acids. In other words, the minerals are absorbed along with the amino acids as a single unit utilizing the amino acids as carrier molecules. Therefore, the problems associated with the competition of ions for active sites and the suppression of specific nutritive mineral elements by others are avoided. This is especially true for compounds such as iron sulfates that must be delivered in relatively large quantities in order for the body to absorb an appropriate amount leading to possible nausea, diarrhea and other discomforts. Yet, because iron is such an important mineral to many physiological functions and because unfortified foods taken in by a typical person lack a sufficient amount of iron, fortification remains one of the best methods of affording people the minimum daily requirement of iron.

In view of the foregoing, it would be useful to provide a composition and method for fortification of a cereal grain kernel with iron, calcium, zinc and/or other minerals. More specifically, it would be useful to provide a composition and method for coating unpulverized or intact cereal grain kernels with amino acid chelates. Because of the increased bioavailability of metals when delivered as the closing member of an amino acid chelate, a smaller amount of metal may be used to fortify a cereal grain kernel, thereby reducing unwanted side effects and unpalatability.

OBJECTS AND SUMMARY OF THE PRESENT INVENTION

It is an object of the present invention to provide a metal fortified cereal grain kernel wherein the metal is highly bioavailable.

Another object of the present invention to provide a cereal grain kernel that is fortified with an amino acid chelate wherein the fortified cereal grain kernel is palatable.

Still another object of the present invention is to provide a cereal grain kernel fortified with one or more amino acid chelates so that a serving of cereal grain kernels may provide the minimum daily requirement of the metal(s) contained within the amino acid chelate.

These and other objects may be accomplished by providing a cereal grain kernel coated with a metal amino acid chelate. Preferred cereal grains include grains such as barley, corn, millet, oats, quinoa, rice, rye, sorghum, triticale, wheat or wild rice. The coating is comprised of a stabilizer and a metal amino acid chelate having a ligand to metal molar ratio from 1:1 to 4:1. Though any metal utilized by the body may be used, iron, calcium, magnesium, zinc, copper, manganese and/or chromium are preferred metals. Similarly, though any amino acid ligand may be used, glycine is a preferred ligand. Coatings containing these metal amino acid chelates are desirable because amino acid chelates are absorbed through the gut and mucosal cells as intact molecules via active transport and are subsequently transported to various tissues so that the mineral or metal ion may be used by the body as needed.

DETAILED DESCRIPTION OF THE INVENTION

Before the present invention dealing with the fortification of cereal grains using amino acid chelates and methods of making the same is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

As used herein, "taste free," "palatable" or "improved palatability" means that compositions for coating or fortifying cereal grain kernels are substantially lacking metallic or undesirable aftertaste. In other words, the chelates used in the present invention have an acceptable taste to the consuming warm-blooded host, i.e., an animal or human being. This is not to say that cereal grain kernels coated with amino acid chelates are completely lacking in flavor or aftertaste.

An "metal amino acid chelate" or "mineral amino acid chelate" is typically defined by coordinate covalent bonds between the metal being chelated and both the carboxyl oxygen group and the α-amino group of the amino acid. As such, a heterocyclic ring is formed with the metal as the closing member. However, as the pH level lowers, the bond between the carboxyl oxygen and the metal closing member becomes less covalent and more ionic, though there may still be a ring structure present. Therefore, an amino acid chelate for purposes of the present invention pertains to any chelate or complex comprised of an amino acid and a metal forming a ring structure.

"Bioavailable" means that the metal source of this invention is in an amino acid chelated form which has been demonstrated to be capable of being transported intact with the chelating amino acid directly across the intestinal wall to the blood stream via active transport.

With this in mind, the present invention is directed toward 1) a cereal grain kernel coated with a metal amino acid chelate; 2) a method of coating cereal grain kernels with a solution containing a metal amino acid chelate; and 3) a coating solution containing a metal amino acid chelate for coating cereal grain kernels.

In the present invention, the coating applied to the cereal grain kernel (or solution used for coating the kernels) is comprised of a metal amino acid chelate and a stabilizer. The ligand to metal molar ratio of the metal amino acid chelate should be from 1:1 to 4:1 (preferably 2:1) and the stabilizer should be a hydrophillic or neutral hydrocolloid gum including, but not limited to, hydroxypropyl cellulose and ethyl cellulose.

Regarding the components of the metal amino acid chelate, the metal(s) may be iron, calcium, magnesium, zinc, copper, manganese and/or chromium. Depending on what metal is used to fortify the various cereal grain kernels, the metal should be present on the kernel at from about 0.001% to 2% by weight. For example, calcium will be present closer to the upper limit of this range, i.e., from about 0.1 to 2.0% by weight, and zinc and iron will be present closer to the lower limit of this range, i.e., from about 0.001% to 0.1% by weight. Further, the ligand(s) may be alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and/or valine including dipeptides, tripeptides and tetrapeptides formed by any combination of the amino acids disclosed. Though any of the above listed amino acid ligand may be used, glycine is a preferred ligand. As such, preferred combinations include ferrous bisglycinate, ferric trisglycinate, calcium bisglycinate and zinc bisglycinate.

Barley, corn, millet, oats, quinoa, rice, rye, sorghum, triticale, wheat and wild rice are some of the more popular cereal grains that may be used with the present invention. However, all cereal grain kernels while intact as kernels are within the scope of the present invention including kernels where the germ and/or husk has been removed.

Finally, a coloring agent, such as titanium dioxide, may optionally be included when appropriate. For example, when coating white rice with ferrous bisglycinate, the use of titanium dioxide acts as a whitening agent to reduce discoloration.

As an example of one of the preferred embodiments, a kernel of rice or other grain may be coated with a compound containing ferrous bisglycinate. This compound may be represented by Formula II as follows:

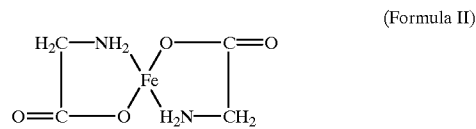

(Formula II)

Calcium bisglycinate and zinc bisglycinate may also be represented by substituting Ca and Zn respectively for Fe. Further, by adding a third glycine ring to Formula II, ferric trisglycinate may be represented.

The method of coating a cereal grain kernel with a metal amino acid chelate may be accomplished by several methods. For example, if it is desired to fortify rice with ferrous bisglycinate, a coating may be prepared and applied by spraying or soaking the cereal grain kernel with a solution containing the chelate, a stabilizer carrier and optionally a coloring agent. If prepared accordingly, the coating is virtually undetectable in texture and is palatable.

Essentially, the method of fortifying cereal grain with an amino acid chelate coating is as follows. First, a cereal grain and a solution containing an amino acid chelate and a carrier stabilizer is provided. Next, a known amount of the solution containing the amino acid chelate is coated on a portion or the entire cereal grain kernel in order to achieve a desired concentration of metal amino acid chelate per cereal kernel.

The moisture is then reduced by procedures generally known. Finally, it may be desired to premix fortified cereal grain kernels with unfortified cereal grain kernels at a ratio that will provide an adequate amount of metal amino acid chelate in a single serving of the now blended cereal kernels to meet the minimum daily requirement for the particular metal. If this step is followed, the preferred ratio of fortified to unfortified cereal grain kernels is from about 1:5 to 1:110 by weight. However, some preparations may not require this step as the coating solution may contain less amino acid chelate or a more concentrated solution may be applied to a larger volume of cereal grain kernels.

The solution used for coating the cereal grain kernels is prepared by dry blending a stabilizer carrier with a metal amino acid chelate and mixing the blend with an aqueous solution, e.g., isopropyl alcohol and water, until a homogenous liquid is formed. If applying the coating using a spraying method, one embodiment includes placing the kernels in a coating pan, forcing hot air onto the kernels and spraying the homogenous liquid while the hot air is flowing. This should be continued until the kernels are saturated to a predetermined degree. Optional steps of 1) covering cereal grain with coloring agent, e.g., titanium dioxide, prior to the step of blowing forced hot air into the pan and 2) covering the cereal grain with a coloring agent after the cereal grain has been sprayed with the homogenous liquid may be followed if it is desirable to alter the color of the fortified cereal grain kernels.

If applying the coating using the soaking method, the kernels should first be soaked in the homogenous liquid described above and dried using conventional drying techniques until the moisture reaches a predetermined level. If necessary, the cereal grain kernels should be separated by shaking. Optionally, titanium dioxide or other coloring agents may be admixed with the fortified cereal grain kernels to alter the color of the kernels.

The following examples illustrate compositions and methods of preparing a metal amino acid chelate coating for cereal grain kernels. Specifically, the examples set forth two of the known coating embodiments, i.e., spraying and soaking, for fortifying rice with a metal amino acid chelate. These examples should not be considered as limitations of the present invention, but should merely illustrate how to make the best known amino acid chelate coatings for cereal grains based upon current experimental data.

EXAMPLES

Example 1

The following is a method for fortifying white rice with ferrous bisglycinate using the spraying method. First, 70 grams of hydroxypropyl cellulose was dry blended with 70 grams of ferrous bisglycinate such as that sold by Albion Laboratories, Inc. under the trademark FERROCHEL™. To the dry ingredients, 4.536 kilograms of water and 1 kilogram of isopropyl alcohol were mixed under sheer and good agitation. This product was mixed until the solution became clear and homogenous. Next, 50 pounds of rice and 250 grams of titanium dioxide were placed in a revolving coating pan. The pan was then rotated until an even coating covered the rice. Hot air was forced into the pan as the solution containing ferrous bisglycinate was sprayed onto the rice. When the entire solution was sprayed onto the rice, an additional 50 grams of titanium dioxide was added to the contents in the pan to complete the batch. From this process, 50 pounds of rice was fortified with ferrous bisglycinate having an iron content of about 0.061% by weight. The recommended rate is 14 milligrams of iron per pound of rice. Therefore, to the 50 pounds of coated rice was admixed 950 pounds of uncoated rice. By evenly mixing coated rice with uncoated rice at this rate, a rice mixture was produced having an iron content of about 14 milligrams of iron per pound of mixed rice.

Example 2

The following is a method for fortifying white rice with ferrous bisglycinate using the soaking method. First, 200 grams of ethyl cellulose was dry blended with 100 grams of titanium dioxide and 70 grams of ferrous bisglycinate such as that sold by Albion Laboratories, Inc. under the trademark FERROCHEL™. Next, these dry ingredients were admixed with 9.126 kilograms of water under sheer and good agitation until a clear and homogenous solution was obtained. The liquid was then poured over 50 pounds of rice until an even covering was obtained. The rice was then placed in a forced air drying oven at 75° C. until the rice had dried to 12.5% moisture. The rice was then shaken to break any clumps into individual grains. An additional 100 grams of titanium dioxide was added to the rice in a revolving pan to complete the batch. From this process, 50 pounds of rice was fortified with ferrous bisglycinate having an iron content of about 0.061% by weight. The recommended rate is 14 milligrams of iron per pound of rice. Therefore, to the 50 pounds of coated rice was admixed 950 pounds of uncoated rice. By evenly mixing coated rice with uncoated rice at this rate, a rice mixture was produced having an iron content of about 14 milligrams of iron per pound of mixed rice.

Example 3

The following is a method for fortifying white rice with calcium bisglycinate using the spraying method. First, 350 grams of hydroxypropyl cellulose was dry blended with 7.71 kilograms of calcium bisglycinate as sold by Albion Laboratories, Inc. under the trademark CALCIUM TASTE FREET™. To the dry ingredients, 22.815 kilograms of water and 4 kilograms of isopropyl alcohol were added and mixed under sheer and good agitation until the solution became clear and homogenous. Next, 250 pounds of rice were placed in a revolving coating pan. While forced hot air was blown into the pan, the solution containing the calcium bisglycinate was sprayed onto the rice until all of the solution was evenly applied. The rice was dried to less than 10% moisture and removed from the coating pan to complete the batch. From this process, 250 pounds of rice was fortified with calcium bisglycinate having a calcium content of about 0.88% by weight, based upon the calcium content contained in CALCIUM TASTE FREET™. The recommended rate is 1000 milligrams of calcium per pound of rice. Therefore, the 250 pounds of coated rice was then admixed with 750 pounds of untreated rice. By evenly mixing coated rice with uncoated rice at this rate, a rice mixture was produced having a calcium content of about 1000 milligrams of calcium per pound of mixed rice.

Example 4

The following is a method for fortifying white rice with zinc bisglycinate using the spraying method. First, 70 grams of hydroxypropyl cellulose was dry blended with 70 grams of zinc bisglycinate. To the dry ingredients, 4.563 kilograms of water and 1 kilogram of isopropyl alcohol were mixed under sheer and good agitation. This product was mixed until the solution became clear and homogenous. Next, 50 pounds of rice and 250 grams of titanium dioxide were placed in a revolving coating pan. The pan was then rotated until an even coating covered the rice. Hot air was forced into the pan as the solution containing zinc bisglycinate was sprayed onto the rice. When the entire solution was sprayed onto the rice, an additional 50 grams of titanium dioxide was added to the contents in the pan to complete the batch. From this process, 50 pounds of rice was fortified with zinc bisglycinate having a zinc content of about 0.061% by weight. The 50 pounds of fortified rice was then admixed with 950 pounds of untreated rice. By evenly mixing coated rice with uncoated rice at this rate, a rice mixture was produced having a zinc content of about 14 milligrams of zinc per pound of mixed rice.

Example 5

The following is a method for fortifying white rice with ferrous bisglycinate using the spraying method. First, 70 grams of hydroxypropyl cellulose was dry blended with 70 grams of ferrous bisglycinate such as that sold by Albion Laboratories, Inc. under the trademark FERROCHEL™. To the dry ingredients, 4.563 kilograms of water and 1 kilogram of isopropyl alcohol were mixed under sheer and good agitation. This product was mixed until the solution became clear and homogenous. Next, 1000 pounds of rice was placed in a coating pan. Hot air was forced into the pan as the solution containing ferrous bisglycinate was sprayed onto the rice. The coated rice was allowed to dry to less than 10%) moisture. At this point, the rice was ready to be packaged. No admixing of fortified rice with unfortified rice was required because the batch of rice generally was coated with approximately ¹⁄₂₀ of the amount of ferrous bisglycinate as was present in Example 1. This process produced an iron content of about 14 milligrams of iron per pound of rice.

While the invention has been described with reference to certain preferred embodiments, those skilled in the art will appreciate that various modifications, changes, omissions, and substitutions can be made without departing from the spirit of the invention. For example, a similar procedure could be applied to wild rice or other grains with or without a coloring agent. Additionally, other metal amino acid chelates could be used to coat other cereal grain kernels. It is therefore intended that the invention be limited only by the scope of the appended claims.

We claim:

1. A cereal grain kernel coated with a metal amino acid chelate wherein said coating is comprised of a stabilizer and a metal amino acid chelate having a ligand to metal molar ratio from 1:1 to 4:1.

2. A cereal grain kernel as in claim 1 wherein said kernel is selected from the group consisting of barley, corn, millet, oats, quinoa, rice, rye, sorghum, triticale, wheat and wild rice.

3. A cereal grain kernel as in claim 2 wherein said ligand is an amino acid selected from the group of consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

4. A cereal grain kernel as in claim 3 wherein said metal is selected from the group consisting of iron, calcium, magnesium, zinc, copper, manganese and chromium.

5. A cereal grain kernel as in claim 4 wherein said metal is present from about 0.001% to 2% by weight.

6. A cereal grain kernel as in claim 5 wherein said kernel is rice.

7. A cereal grain kernel as in claim 5 wherein said stabilizer carrier is a hydrocolloid gum.

8. A cereal grain kernel as in claim 5 wherein said coating is applied by a spraying method.

9. A cereal grain kernel as in claim 5 wherein said coating is applied by a soaking method.

10. A cereal grain kernel as in claim 5 wherein said ligand is glycine.

11. A cereal grain kernel as in claim 10 wherein said metal is calcium.

12. A cereal grain kernel as in claim 11 wherein said calcium is present from about 0.1% to 2% by weight.

13. A cereal grain kernel as in claim 12 wherein said metal amino acid chelate is calcium bisglycinate.

14. A cereal grain kernel as in claim 13 wherein said coating contains titanium dioxide.

15. A cereal grain kernel as in claim 10 wherein said metal is zinc.

16. A cereal grain kernel as in claim 15 wherein said zinc is present from about 0.001% to 0.1% by weight.

17. A cereal grain kernel as in claim 16 wherein said metal amino acid chelate is zinc bisglycinate.

18. A cereal grain kernel as in claim 17 wherein said gum is selected from the group consisting of hydroxypropyl cellulose and ethyl cellulose.

19. A cereal grain kernel as in claim 10 wherein said metal is iron.

20. A cereal grain kernel as in claim 19 wherein said iron is present from about 0.001% to 0.1% by weight.

21. A cereal grain kernel as in claim 20 wherein said metal amino acid chelate is ferrous bisglycinate.

22. A cereal grain kernel as in claim 20 wherein said metal amino acid chelate is ferric trisglycinate.

23. A method of fortifying a cereal grain kernel with a coating containing a metal amino acid chelate comprising:
    providing (a) a cereal grain kernel and (b) a coating solution comprised of a metal amino acid chelate having a ligand to metal molar ratio of from 1:1 to 4:1 and a stabilizer carrier; and
    coating said kernel with said solution.

24. A method of fortifying a cereal grain kernel as in claim 23 wherein the step of providing a coating solution comprises the steps of:
    blending said stabilizer carrier with said metal amino acid chelate; and
    mixing said blend with an aqueous solution until a homogenous liquid is formed.

25. A method of fortifying a cereal grain kernel as in claim 24 wherein said kernel is selected from the group consisting of barley, corn, millet, oats, quinoa, rice, rye, sorghum, triticale, wheat and wild rice.

26. A method of fortifying a cereal grain kernel as in claim 25 wherein said ligand is an amino acid selected from the group of consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

27. A method of fortifying a cereal grain kernel as in claim 26 wherein said metal is selected from the group consisting of iron, calcium, magnesium, zinc, copper, manganese and chromium.

28. A method of fortifying a cereal grain kernel as in claim 27 wherein said stabilizer carrier is a hydrocolloid gum.

29. A method of fortifying a cereal grain kernel as in claim 28 wherein said gum is selected from the group consisting of hydroxypropyl cellulose and ethyl cellulose.

30. A method of fortifying a cereal grain kernel as in claim 27 wherein said aqueous solution is comprised of a member selected from the group consisting of ethanol, isopropyl alcohol, water and combinations thereof.

31. A method of fortifying a cereal grain kernel as in claim 27 wherein said ligand is glycine.

32. A method of fortifying a cereal grain kernel as in claim 31 wherein said metal is calcium.

33. A method of fortifying a cereal grain kernel as in claim 32 wherein said metal amino acid chelate is calcium bisglycinate.

34. A method of fortifying a cereal grain kernel as in claim 31 wherein said metal is zinc.

35. A method of fortifying a cereal grain kernel as in claim 34 wherein said metal amino acid chelate is zinc bisglycinate.

36. A method of fortifying a cereal grain kernel as in claim 31 wherein said metal is iron.

37. A method of fortifying a cereal grain kernel as in claim 36 wherein said metal amino acid chelate is ferrous bisglycinate.

38. A method of fortifying a cereal grain kernel as in claim 36 wherein said metal amino acid chelate is ferric trisglycinate.

39. A method of fortifying a cereal grain kernel as in claim 23 wherein the step of coating further comprises the steps of:

placing said cereal grain kernel on a coating surface;

spraying said homogenous liquid onto said cereal grain kernel; and drying said cereal grain kernel.

40. A method of fortifying a cereal grain kernel as in claim 39 wherein the step of coating further comprises the steps of:

covering said cereal grain kernel with titanium dioxide prior to said step of spraying; and covering said cereal grain kernel with said titanium dioxide after said cereal grain kernel has been sprayed with said homogenous liquid.

41. A method of fortifying a cereal grain kernel as in claim 23 wherein the step of coating comprises the steps of:

soaking said cereal grain kernel in said homogenous liquid; and drying said cereal grain kernel to a predetermined moisture level.

42. A method of fortifying a cereal grain kernel as in claim 41 wherein said predetermined moisture level is from 1% to 20%.

43. A method of fortifying a cereal grain kernel as in claim 41 wherein titanium dioxide is contacted with said cereal grain kernel after said cereal grain kernel has been dried to said predetermined moisture level.

44. A method of fortifying a cereal grain kernel as in claim 23 wherein a step subsequent to said coating step comprises premixing said coated cereal grain kernels with uncoated cereal grain kernels at a ratio from 1:5 to 1:100 by weight.

45. A coating solution for cereal grain kernel fortification comprising water, a stabilizer carrier, a metal amino acid chelate having a ligand to metal molar ratio from 1:1 to 4:1.

46. A coating solution as in claim 45 wherein said ligand is an amino acid selected from the group of consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

47. A coating solution as in claim 46 wherein said metal is selected from the group consisting of iron, calcium, magnesium, zinc, copper, manganese and chromium.

48. A coating solution as in claim 47 wherein said stabilizer carrier is a hydrocolloid gum.

49. A coating solution as in claim 48 wherein said gum is selected from the group consisting of hydroxypropyl cellulose and ethyl cellulose.

50. A coating solution as in claim 47 wherein said coating solution is further comprised of a member selected from the group consisting of ethanol, isopropyl alcohol and combinations thereof.

51. A coating solution as in claim 47 wherein said ligand of said metal amino acid chelate is glycine.

52. A coating solution as in claim 51 wherein said metal is calcium.

53. A coating solution as in claim 52 wherein said metal amino acid chelate is calcium bisglycinate.

54. A coating solution as in claim 51 wherein said metal is zinc.

55. A coating solution as in claim 54 wherein said metal amino acid chelate is zinc bisglycinate.

56. A coating solution as in claim 51 wherein said metal is iron.

57. A coating solution as in claim 56 wherein said metal amino acid chelate is ferrous bisglycinate.

58. A coating solution as in claim 56 wherein said metal amino acid chelate is ferric trisglycinate.

* * * * *